United States Patent
Bai et al.

(10) Patent No.: US 11,846,558 B2
(45) Date of Patent: Dec. 19, 2023

(54) APPARATUS AND METHOD FOR WAVEFRONT RECONSTRUCTION BASED ON ROTATIONALLY SYMMETRIC EXTENDED STRUCTURED LIGHT ILLUMINATION

(71) Applicant: Zhejiang University, Hangzhou (CN)

(72) Inventors: Jian Bai, Hangzhou (CN); Lei Zhao, Hangzhou (CN); Binjie Lu, Hangzhou (CN); Xiangdong Zhou, Hangzhou (CN); Jing Hou, Hangzhou (CN)

(73) Assignee: Zhejiang University, Zhejiang (CN)

( * ) Notice: Subject to any disclaimer, the term of this patent is extended or adjusted under 35 U.S.C. 154(b) by 472 days.

(21) Appl. No.: 17/284,861

(22) PCT Filed: Jul. 20, 2020

(86) PCT No.: PCT/CN2020/102933
§ 371 (c)(1),
(2) Date: Apr. 13, 2021

(87) PCT Pub. No.: WO2021/068594
PCT Pub. Date: Apr. 15, 2021

(65) Prior Publication Data
US 2022/0187160 A1    Jun. 16, 2022

(30) Foreign Application Priority Data
Oct. 10, 2019   (CN) .......................... 201910959034.6

(51) Int. Cl.
*G01M 11/02* (2006.01)
*G02B 5/20* (2006.01)
*G02B 27/12* (2006.01)

(52) U.S. Cl.
CPC ......... *G01M 11/0207* (2013.01); *G02B 5/205* (2013.01); *G02B 27/126* (2013.01)

(58) Field of Classification Search
CPC ... G01M 11/0207; G02B 5/205; G02B 27/126
See application file for complete search history.

(56) References Cited

U.S. PATENT DOCUMENTS

| 2014/0160468 A1* | 6/2014 | Iwanabe | G01M 11/31 |
| | | | 356/73.1 |
| 2022/0003633 A1* | 1/2022 | Bai | G01M 11/0271 |
| 2022/0221633 A1* | 7/2022 | Bai | G02B 5/1876 |

FOREIGN PATENT DOCUMENTS

| CN | 104198054 | 12/2014 |
| CN | 107300420 | 10/2017 |

(Continued)

OTHER PUBLICATIONS

English Abstract of CN10498054 obtained from Espacenet on Mar. 8, 2021.

(Continued)

*Primary Examiner* — Kevin Quarterman
(74) *Attorney, Agent, or Firm* — Woodard, Emhardt, Henry, Reeves & Wagner, LLP

(57) ABSTRACT

The present disclosure provides an apparatus and method for wavefront reconstruction based on rotationally symmetric extended structured light illumination. The apparatus includes a laser device, a neutral density filter, a microscope objective, a pinhole, a collimating lens, a beam splitter prism, a spatial light modulator, a lens to be measured, and an image acquisition device that are sequentially arranged. The method permits modulation of incident parallel light into phase grating-like structured light by using a spatial light modulator. Based on the characteristic of non-infinitely small pixel unit of the spatial light modulator, changing the modulation pattern of the spatial light modulator may result in different forms of structured light. Not only the object to be measured but also the real structured light wavefront can be recovered by acquiring diffraction spots at the focal plane (Continued)

and simultaneously updating the object plane and the structured light plane using an algorithm.

12 Claims, 4 Drawing Sheets

(56) References Cited

FOREIGN PATENT DOCUMENTS

| | | |
|---|---|---|
| CN | 110160663 | 8/2019 |
| CN | 110702383 | 1/2020 |
| CN | 115524018 A * | 12/2022 |

OTHER PUBLICATIONS

English Abstract of CN107300420 obtained from Espacenet on Mar. 8, 2021.
English Abstract of CN110160663 obtained from Espacenet on Mar. 8, 2021.
English Abstract of CN110702383 obtained from Espacenet on Mar. 8, 2021.
Li, Xiao-ping et al. Quantitative analysis on phase diversity technique based on liquid crystal spatial light modulator Chinese Journal of Liquid Crystals and Displays, vol. 32, No. 3 (Mar. 2017), pp. 234-239.
Search Report in International Application No. PCT/CN2020/102933, dated Oct. 26, 2020, 5 pages.

* cited by examiner

APPARATUS AND METHOD FOR WAVEFRONT RECONSTRUCTION BASED ON ROTATIONALLY SYMMETRIC EXTENDED STRUCTURED LIGHT ILLUMINATION

The present application claims priority to Chinese Patent Application No. 201910959034.6, filed with the China National Intellectual Property Administration (CNIPA) on Oct. 10, 2019, and entitled "APPARATUS AND METHOD FOR WAVEFRONT RECONSTRUCTION BASED ON ROTATIONALLY SYMMETRIC EXTENDED STRUCTURED LIGHT ILLUMINATION", which is incorporated herein by reference in its entirety.

TECHNICAL FIELD

The present disclosure relates to the technical field of optical measurement, and more particularly, to an apparatus and method for wavefront reconstruction based on rotationally symmetric extended structured light illumination.

BACKGROUND

Computational imaging is widely used to improve the imaging quality, simplify imaging systems and break through the physical limitations of optical systems and image acquisition equipment to achieve super-resolutions, etc. Phase retrieval, as a way of realizing computational light-field imaging, has been widely used since it was proposed in the 1970s because of its stable and reliable convergence effect. In the 1990s, the University of Rochester USA successfully used the phase retrieval method in the aberration correction of the Hubble telescope. A traditional iterative phase retrieval method, based on Fourier transform and inverse Fourier transform, allows for repeated iterations between space domain and Fourier domain, and imposes restrictions on real amplitude in the Fourier domain and on space support domain in the space domain. This method may undergo fast convergence at first several iterations, but then stagnant convergence and often final convergence to local optimal solution, which makes it difficult to achieve accurate wavefront reconstruction.

A lot of research has been done to improve this problem. Diffraction spots acquired in the Fourier domain are often centrally symmetric and limited by the size of a pixel unit of an image acquisition device, and there is often little acquired diffraction spot information. In view of this, various improvement measures have been proposed, such as a sub-aperture stitching method, which adopts partial stacking of adjacent sub-apertures to increase the amount of diffraction spot information. The sub-aperture stitching method is complicated and prone to causing a stitching error. Another method is to add diffractive optical elements such as a random phase plate to an optical system to increase the amount of diffraction information, but the machining error of the random phase plate will result in reduced accuracy of wavefront reconstruction.

SUMMARY

The present disclosure aims to provide an apparatus and method for wavefront reconstruction based on rotationally symmetric extended structured light illumination so as to solve the problem of the traditional iterative phase retrieval method being trapped in local optical solution. Moreover, an error caused by the modulation process of a traditional diffractive optical element can be avoided, and a movement error can be avoided by using a spatial light modulator to generate structured light.

The technical solution of the present disclosure is as follows:

The present disclosure provides an apparatus for wavefront reconstruction based on rotationally symmetric extended structured light illumination, including: a laser device (1), a neutral density filter (2), a microscope objective (3), a pinhole (4), a collimating lens (5), a beam splitter prism (6), a spatial light modulator (7), a lens (8) to be measured and an image acquisition device (9);

the neutral density filter (2) is located in parallel behind the laser device (1); the microscope objective (3) is located in parallel behind the neutral density filter (2); the pinhole (4) is located in parallel behind the microscope objective (3) and at a focal point of the microscope objective (3); the collimating lens (5) is located in parallel behind the pinhole (4) and an anterior focal point of the collimating lens (5) is located at the pinhole (4); the beam splitter prism (6) is located in parallel behind the collimating lens (5); the spatial light modulator (7) is located in parallel behind the beam splitter prism (6); the lens (8) to be measured is perpendicular to an outgoing beam from the laser device (1) and shares a common optical axis with a beam splitting facet of the beam splitter prism (6); the image acquisition device (9) is located in parallel at a posterior focal point of the lens (8) to be measured; the lens (8) to be measured includes an object to be measured;

a laser beam emitted by the laser device (1) is sequentially subjected to attenuation by the neutral density filter (2), extension by the collimating lens (5) into plane-parallel light, splitting by the beam splitter prism (6), and modulation by the spatial light modulator (7) to generate structured light; the structured light is sequentially reflected by the beam splitter prism (6) and converged by the lens (8) to be measured to the image acquisition device (9), and a diffraction spot containing information of the object to be measured and the structured light is acquired by the image acquisition device (9).

Optionally, the image acquisition device (9) is a charge coupled device (CCD) camera.

Optionally, the laser beam emitted by the laser device (1) has a wavelength of 632.8 nm.

The present disclosure further provides a method for wavefront reconstruction based on rotationally symmetric extended structured light illumination, implemented based on the apparatus for wavefront reconstruction based on rotationally symmetric extended structured light illumination described above, and including the following steps:

S1: setting up the apparatus for wavefront reconstruction based on rotationally symmetric extended structured light illumination, and acquiring a diffraction spot by the image acquisition device (9);

S2: performing, by using a phase retrieval method based on rotationally symmetric extended structured light illumination, phase retrieval on the diffraction spot acquired by the image acquisition device to obtain wavefront information of the lens to be measured;

the step S1 including:

S1.1: determining an initial orientation of the spatial light modulator, and obtaining optical parameters and rotation parameters of the structured light generated by the spatial light modulator, where the optical parameters of the structured light include a period and an amplitude of the structured light; the rotation parameters of the structured light include a single rotation angle $\Delta\varphi$, a total number N of rotations and a current rotation count n, where N=360°/Δφ, N being a multiple of 4; the structured light has an initial angle φ₀=0°, and the rotation count n has an initial value of 1;

S1.2: acquiring the diffraction spot;

S1.3: determining whether the current rotation count is greater than N/4;

if the current rotation count is greater than N/4, going to step S1.4;

if the current rotation count is not greater than N/4, rotating the structured light by the single rotation angle Δφ, updating the current rotation count to n+1, and updating the current angle of the structured light to $\varphi_n$, $\varphi_n=\varphi_{n-1}+\Delta\varphi$, $\varphi_{n-1}$ being an angle of the structured light corresponding to a previous rotation count; and going back to step S1.2;

S1.4: determine whether the number of direction changes of the spatial light modulator is equal to 3;

if the number of direction changes of the spatial light modulator is equal to 3, going to step 2.1;

if the number of direction changes of the spatial light modulator is not equal to 3, rotating counterclockwise the spatial light modulator by 90 degrees; updating the current rotation count to 1, updating the current angle of the structured light to 0°, and going back to step S1.2;

the step S2 including:

S2.1: sequentially inputting N diffraction spots acquired by the image acquisition device, and obtaining parameters of the lens to be measured, the rotation parameters of the structured light and a total number of iterations, where the parameters of the lens to be measured include a focal length and an aperture of the lens to be measured, and the rotation parameters of the structured light include the single rotation angle Δφ and the current rotation count n; the current rotation count has an initial value of 1, and an iteration count k has an initial value of 1; and the total number of iterations is denoted by N_iter;

S2.2: obtaining a current design value of the rotationally symmetric structured light and a current estimated value of the lens to be measured; when k=1 and n=1, determining an initial design value of the structured light as the current design value of the rotationally symmetric structured light and an initial value of the lens to be measured as the current estimated value of the lens to be measured; when k=1 and n #1, determining a design value of the structured light at an angle of $\varphi_n$ as the current design value of the rotationally symmetric structured light and the initial value of the lens to be measured as the current estimated value of the lens to be measured; and when k>1, determining an updated design value of the rotationally symmetric structured light at a previous iteration as the current design value of the rotationally symmetric structured light and an updated estimated value of the lens to be measured at the previous iteration as the current estimated value of the lens to be measured;

S2.3: stacking up the current design value of the rotationally symmetric structured light and the current estimated value of the lens to be measured to obtain a stacked value; and diffracting the stacked value to a spectrum plane using a computational diffraction method to obtain an estimated spectrum plane value;

S2.4: determining the square root of the intensity of a current diffraction spot as an amplitude value of the estimated spectrum plane value, where the current diffraction spot is the diffraction spot corresponding to the current rotation count n;

S2.5: updating the design value of the rotationally symmetric structured light and the estimated value of the lens to be measured;

S2.6: setting n=n+1; if n≤N/4, going back to step S2.2; and if n>N/4, going to step 2.7; and S2.7: setting k=k+1; if k≤N_iter, going back to step S2.2; and if k>N_iter, ending the iteration, and determining an updated estimated value of the lens to be measured at the current iteration as the final wavefront of the lens to be measured.

Optionally, after determining the square root of the intensity of a current diffraction spot as an amplitude value of the estimated spectrum plane value, the method further includes:

obtaining an estimated stacked value by an inverse transform back to a space domain using an inverse diffraction method.

Optionally, the updating of the design value of the rotationally symmetric structured light and the estimated value of the lens to be measured specifically includes:

updating the estimated value of the lens to be measured based on the estimated stacked value according to a formula given below:

$$O^{(k(N/4-1)+n+1)} =$$

$$O^{(k(N/4-1)+n)} + \frac{|I_{ill}^{(n)(k)}|}{\max(\max(|I_{ill}^{(n)(k)}|))} \times \frac{I_{ill}^{(n)(k)*}}{\left(|I_{ill}^{(n)(k)}|^2 + \alpha\right)} \times (U^{(n)(k)} - U^{(n)(k-1)});$$

updating the design value of the rotationally symmetric structured light based on the estimated stacked value according to a formula given below:

$$I_{ill}^{(n)(k+1)} = I_{ill}^{(n)(k)} +$$

$$\frac{|O^{(k(N/4-1)+n)}|}{\max(\max(|O^{(k(N/4-1)+n)}|))} \times \frac{O^{(k(N/4-1)+n)*}}{(|O^{(k(N/4-1)+n)}|^2 + \alpha)} \times (U^{(n)(k)} - U^{(n)(k-1)});$$

where $O^{(k(N/4-1)+n+1)}$ is the updated estimated value of the lens to be measured, $O^{(k(N/4-1)+n)}$ is the current estimated value of the lens to be measured, $U^{(n)(k)}$ is an estimated stacked value at the current iteration, $U^{(n)(k-1)}$ is an estimated stacked value at the previous iteration, α is a constant, $I_{ill}^{(n)(k)}$ is the current design value of the rotationally symmetric structured light, and $I_{ill}^{(n)(k+1)}$ is the updated design value of the rotationally symmetric structured light.

Compared with the prior art, the present disclosure has the following advantages:

The apparatus for wavefront reconstruction based on rotationally symmetric extended structured light illumination provided in the present disclosure can avoid the error resulting from mechanical rotating modulation by modulating the structured light with the spatial light modulator. The method for wavefront reconstruction provided in the present disclosure can effectively depress the error caused by the spatial light modulator and realize accurate wavefront reconstruction of a lens to be measured by simultaneously recovering the wavefront to be measured and the structured light. The use of structured light illumination increases the amount of information in the acquired diffraction spots and improves the algorithm convergence accuracy.

BRIEF DESCRIPTION OF THE DRAWINGS

The present disclosure will be further explained with reference to the accompanying drawings.

Figure 1:
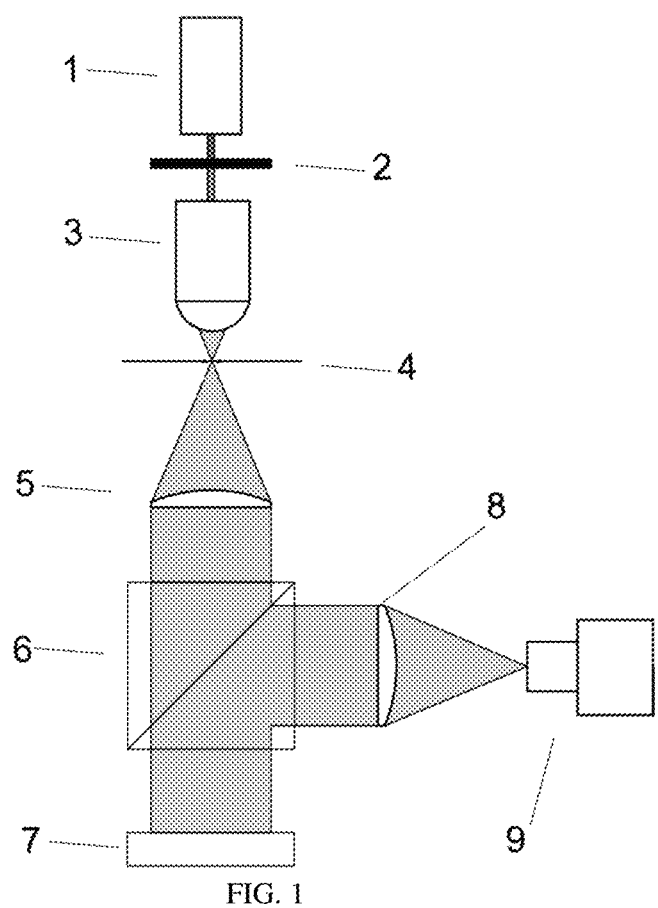
FIG. 1 is a structural diagram of an apparatus for wavefront reconstruction based on rotationally symmetric extended structured light illumination according to an embodiment of the present disclosure.

Reference numerals in the FIGS.: 1—laser device, 2—neutral density filter, 3—microscope objective, 4—pinhole, 5—collimating lens, 6—beam splitter prism, 7—spatial light modulator, 8—lens to be measured, and 9—image acquisition device.

DETAILED DESCRIPTION

The technical solutions in embodiments of the present disclosure will be described in detail below with reference to the accompanying drawings in the embodiments of the present disclosure. Apparently, the described embodiments are merely a part rather than all of the embodiments of the present disclosure. All other embodiments derived from the embodiments in the present disclosure by a person of ordinary skill in the art without creative work shall fall within the protection scope of the present disclosure.

As shown in FIG. 1, an apparatus for wavefront reconstruction based on expanded rotating symmetric structured light illumination includes a laser device 1, a neutral density filter 2, a microscope objective 3, a pinhole 4, a collimating lens 5, a beam splitter prism 6, a spatial light modulator 7, a lens 8 to be measured and an image acquisition device 9. The neutral density filter 2 is located in parallel behind the laser device 1. The microscope objective 3 is located in parallel behind the neutral density filter 2. The pinhole 4 is located in parallel behind the microscope objective 3 and at the focal point of the microscope objective 3. The collimating lens 5 is located in parallel behind the pinhole 4 and the anterior focal point of the collimating lens 5 is located at the pinhole 4. The beam splitter prism 6 is located in parallel behind the collimating lens 5. The spatial light modulator 7 is located in parallel behind the beam splitter prism 6. The lens 8 to be measured is perpendicular to an outgoing beam from the laser device 1 and shares a common optical axis with the beam splitting facet of the beam splitter prism 6. The image acquisition device 9 is located in parallel at the posterior focal point of the lens 8 to be measured. The lens 8 to be measured includes an object to be measured.

A laser beam emitted by the laser device 1 is sequentially subjected to attenuation by the neutral density filter 2, convergence and magnification by the microscope objective 3, extension by the collimating lens 5 into plane-parallel light, splitting by the upper surface of the beam splitting facet of the beam splitter prism 6, and modulation by the spatial light modulator 7 to generate structured light. The structured light is reflected by the lower surface of the beam splitting facet of the beam splitter prism 6 to the lens 8 to be measured. After being converged by the lens 8 to be measured, the structured light carrying the information of the object to be measured reaches the image acquisition device 9, and a diffraction spot containing the information of the object to be measured and the structured light is acquired by the image acquisition device 9.

In one implementation, the light wave emitted by the laser device 1 has a wavelength of 632.8 nm.

In one implementation, the image acquisition device 9 is a charge coupled device (CCD) camera for capturing a diffraction spot image.

Figure 2:
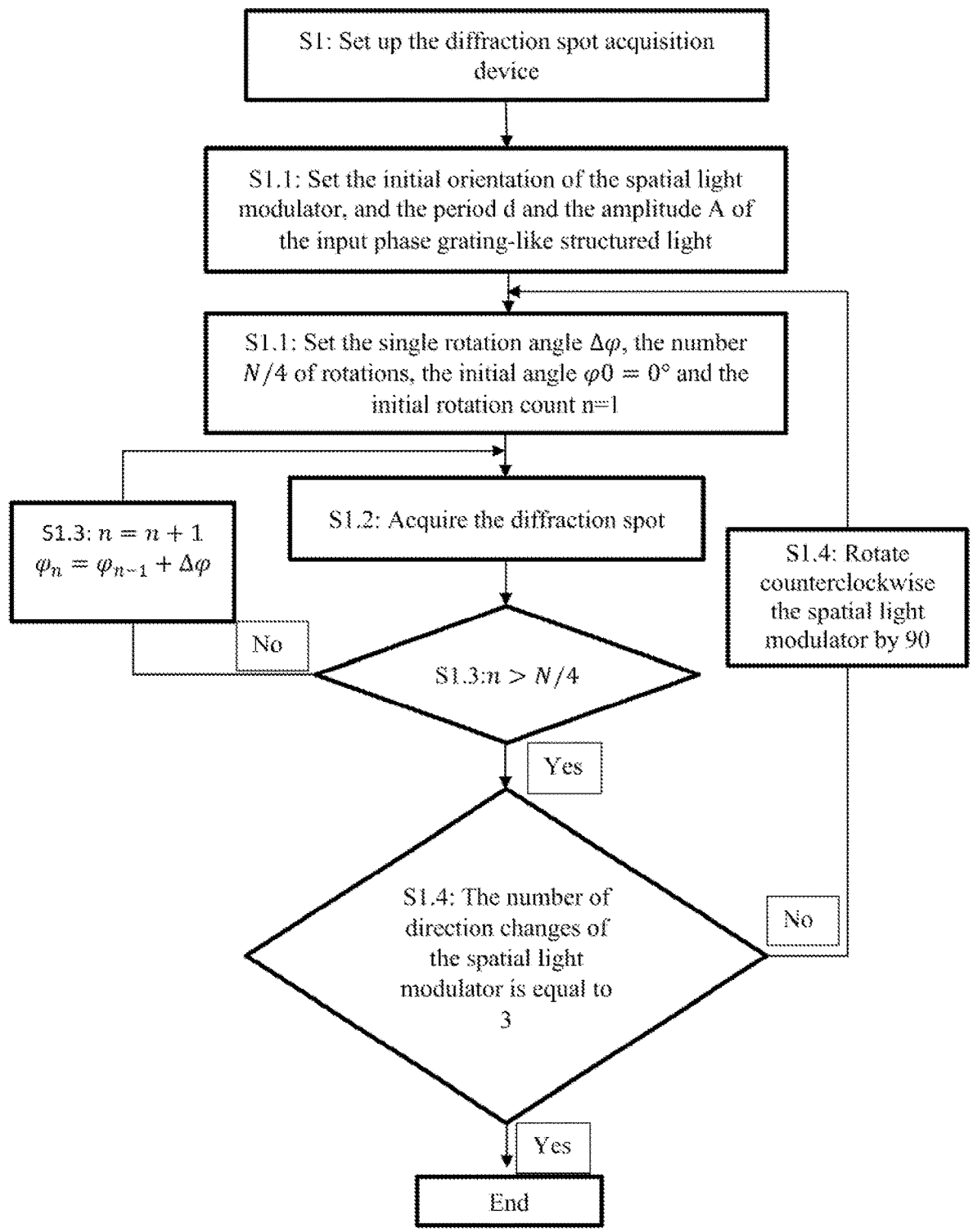
FIG. 2 is a flowchart of diffraction spot acquisition according to an embodiment of the present disclosure.

Based on the above apparatus for wavefront reconstruction based on rotationally symmetric extended structured light illumination, the present disclosure further provides a method for wavefront reconstruction based on rotationally symmetric extended structured light illumination. The method includes the following steps:

S1: set up the apparatus for wavefront reconstruction and acquire a diffraction spot by the image acquisition device 9. As shown in FIG. 2, the acquisition of a diffraction spot includes the following steps:

S1.1: set an initial orientation of the spatial light modulator 7 and obtain the period and amplitude of input phase grating-like structured light. A light beam passes through the beam splitter prism 6 to the spatial light modulator 7 which includes an input pattern and is modulated by the spatial light modulator 7 to provide the input phase grating-like structured light, namely the above-mentioned structured light reflected by the beam splitter prism 6 to the lens 8 to be measured. The period and amplitude of the structured light can be adjusted by adjusting the period and amplitude of the input pattern in the spatial light modulator 7. Similarly, rotation parameters of the structured light can be adjusted by adjusting the rotation parameters of the input pattern in the spatial light modulator 7. The rotation parameters of the structured light include a single rotation angle $\Delta\varphi$, a total number N of rotations, and a rotation count n, where $N=360°/\Delta\varphi$, N being a multiple of 4; the structured light has an initial angle $\varphi_0=0°$, and the rotation count n has an initial value of 1.

S1.2: acquire the diffraction spot.

S1.3: determine whether n is greater than N/4. If yes, go to step S1.4; if no, let n=n+1 and $\varphi_n=\varphi_{n-1}+\Delta\varphi$, rotate the structured light by the single rotation angle $\Delta\varphi$, and go back to S1.2 to acquire the rotated diffraction spot.

S1.4: determine whether the number of direction changes of the spatial light modulator is equal to 3. If yes, go to step S2; otherwise, rotate counterclockwise the spatial light modulator 90 degrees, initialize the rotation count and the initial angle, let n=1 and $\varphi_0=0°$, and go back to step S1.2.

Figure 3:
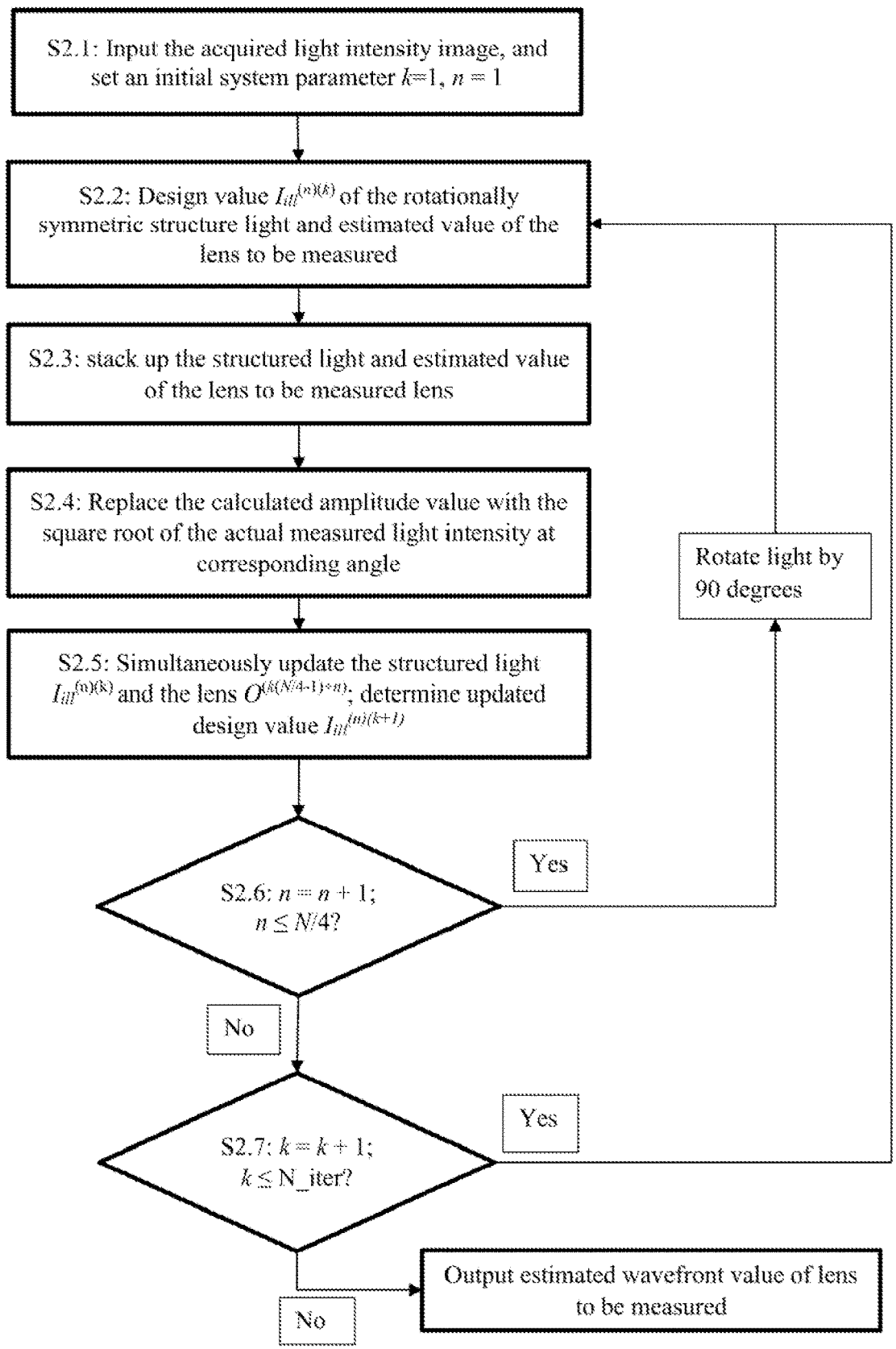
FIG. 3 is a flowchart of a wavefront phase retrieval method based on rotationally symmetric extended structured light illumination according to an embodiment of the present disclosure.

S2: perform, by using a phase retrieval method based on rotationally symmetric extended structured light illumination, phase retrieval on the diffraction spot acquired in S1 to obtain wavefront information of the lens to be measured. As shown in FIG. 3, step S2 specifically includes the following steps:

S2.1: input N diffraction spots acquired by the image acquisition device 9, obtain the focal length f and aperture D of the lens 8 to be measured, and obtain the single rotation angle $\Delta\varphi$ of the input phase grating-like structured light, the rotation count n thereof in the range of 0 to 90°, the initial angle $\varphi_0=0°$, the initial rotation count n=1, a total number N_iter of iterations and an initial iteration count k=1.

S2.2: obtain the current design value of the rotationally symmetric structured light and the current estimated value of the lens to be measured. When k=1 and n=1, determine the initial design value of the structured light as the current design value of the rotationally symmetric structured light and the initial value of the lens to be measured as the current estimated value of the lens to be measured; when k=1 and n≠1, determine the design value of the structured light at the angle of $\varphi_n$ as the current design value of the rotationally symmetric structured light and the initial value of the lens to be measured as the current estimated value of the lens to be measured; and when k>1, determine the updated design value of the rotationally symmetric structured light at the previous iteration as the current design value of the rotationally symmetric structured light and the updated estimated value of the lens to be measured at the previous iteration as the current estimated value of the lens to be measured.

S2.3: stack up the current design value of the rotationally symmetric structured light and the current estimated value of the lens to be measured to obtain a stacked value; and diffract the stacked value to a spectrum plane using a computational diffraction method to obtain an estimated spectrum plane value.

S2.4: replace the amplitude value of the estimated spectrum plane value with the square root of an actual measured light intensity value at an angle corresponding to the current rotation count n.

The actual measured light intensity value at an angle corresponding to the current rotation count n refers to the intensity of the diffraction spot corresponding to the current rotation count n.

S2.5: simultaneously update the design value $I_{ill}^{(i)(k)}$ of the rotationally symmetric structured light and the estimated value $O^{(k(N/4-1)+i)}$ of the lens to be measured. Updating formulas are given below:

$$O^{(k(N/4-1)+i+1)} = O^{(k(N/4-1)+i)} +$$

$$\frac{|I_{ill}^{(i)(k)}|}{\max(\max(|I_{ill}^{(i)(k)}|))} \times \frac{I_{ill}^{(i)(k)*}}{(|I_{ill}^{(i)(k)}|^2 + \alpha)} \times (U^{(i)(k)} - U^{(i)(k-1)}); \text{ and}$$

$$I_{ill}^{(i)(k+1)} = I_{ill}^{(i)(k+1)} + \frac{|O^{(k(N/4-1)+i)}|}{\max(\max(|O^{(k(N/4-1)+i)}|))} \times$$

$$\frac{O^{(k(N/4-1)+i)*}}{(|O^{(k(N/4-1)+i)}|^2 + \alpha)} \times (U^{(i)(k)} - U^{(i)(k-1)});$$

where $O^{(k(N/4-1)+n+1)}$ is the updated estimated value of the lens to be measured, while $O^{(k(N/4-1)+n)}$ the current estimated value of the lens to be measured, $U^{(n)(k)}$ an estimated stacked value at the current iteration, $U^{(n)(k-1)}$ an estimated stacked value at the previous iteration, $\alpha$ a constant, $I_{ill}^{(n)(k)}$ the current design value of the rotationally symmetric structured light, and $I_{ill}^{(n)(k+1)}$ the updated design value of the rotationally symmetric structured light rotated 90 degrees counterclockwise from this angle.

The estimated stacked value at the current iteration is obtained by an inverse transform back to space domain using an inverse diffraction method.

S2.6: set i=i+1, if i≤N/4, go back to S2.2; otherwise, go to step S2.7.

S2.7: set k=k+1, if k≤N_iter, go back to S2.2; otherwise, end the iteration, and output the estimated value of the lens to be measured as the final wavefront of the lens to be measured.

According to the present disclosure, the incident parallel light can be modulated into the phase grating-like structured light by using the spatial light modulator. Based on the characteristic of non-infinitely small pixel unit of the spatial light modulator, changing the modulation pattern of the spatial light modulator may result in different forms of structured light. Not only the object to be measured but also the real structured light wavefront can be recovered by acquiring diffraction spots at the focal plane and simultaneously updating the object plane and the structured light plane using an algorithm. Thus, the recovery error due to inaccurate known information of the structured light can be avoided. According to the present disclosure, high-steep wavefront phase retrieval can be realized without moving the image acquisition device, and the rotation error caused by traditional rotating illumination can be avoided by the use of the spatial light modulator.

Figure 4:
FIG. 4 shows original images to be recovered, (a) being an amplitude image to be recovered and (b) being a phase image to be recovered.
Figure 4:
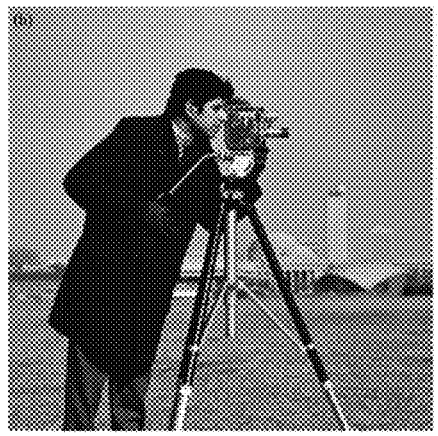
Figure 5:
FIG. 5 shows recovered images obtained by using the method of the present disclosure, (a) being the recovered amplitude image and (b) being the recovered phase image.
Figure 5:
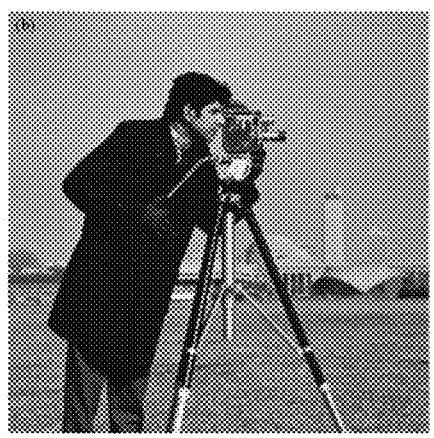
Figure 6:
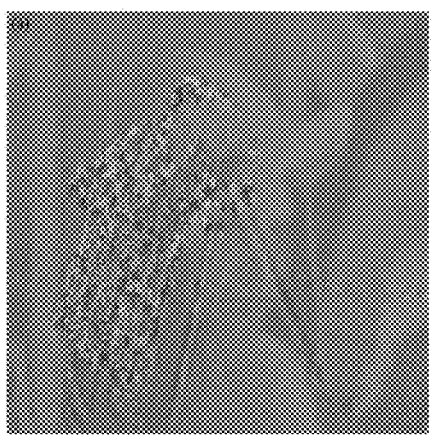
FIG. 6 shows recovered images obtained by using a serial transmission algorithm, (a) being the recovered amplitude image and (b) being the recovered phase image.
Figure 6:
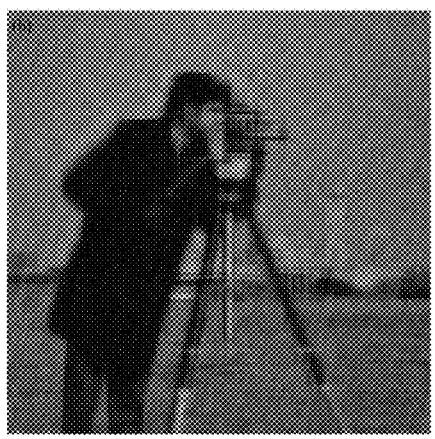

Ideally, the method for wavefront reconstruction based on rotationally symmetric extended structured light illumination can achieve 100% wavefront recovery, which overcomes the disadvantage of easy convergence to local optimal solution by the traditional iterative method. The method for wavefront reconstruction based on rotationally symmetric extended structured light illumination in the present disclosure can avoid the recovery error caused by actual unsatisfactory illumination light. Taking recovery of images of lena and cameraman for example, as shown in FIG. 4, a comparison was made between recovery by rotationally structured light illumination and recovery by the traditional multi-image iterative phase retrieval method, with recovery results shown in FIG. 5 and FIG. 6. It can be seen from the figures that the recovery effect of the method of the present disclosure is significantly better than that of the traditional multi-image iterative phase retrieval method.

While the embodiments of the present disclosure are described in detail above with reference to the accompanying drawings, the present disclosure is not limited to the described embodiments, and various variations can be made by those of ordinary skill in the art in the context of their knowledge without departing from the spirit of the present disclosure.

What is claimed is:

1. An apparatus for wavefront reconstruction based on rotationally symmetric extended structured light illumination, comprising: a laser device (1), a neutral density filter (2), a microscope objective (3), a pinhole (4), a collimating lens (5), a beam splitter prism (6), a spatial light modulator (7), a lens (8) to be measured and an image acquisition device (9);

the neutral density filter (2) is located in parallel behind the laser device (1); the microscope objective (3) is located in parallel behind the neutral density filter (2); the pinhole (4) is located in parallel behind the microscope objective (3) and at a focal point of the microscope objective (3); the collimating lens (5) is located in parallel behind the pinhole (4) and an anterior focal point of the collimating lens (5) is located at the pinhole (4); the beam splitter prism (6) is located in parallel behind the collimating lens (5); the spatial light modulator (7) is located in parallel behind the beam splitter prism (6); the lens (8) to be measured is perpendicular to an outgoing beam from the laser device (1) and shares a common optical axis with a beam splitting facet of the beam splitter prism (6); the image acquisition device (9) is located in parallel at a posterior focal point of the lens (8) to be measured; the lens (8) to be measured comprises an object to be measured;

a laser beam emitted by the laser device (1) is sequentially subjected to attenuation by the neutral density filter (2), extension by the collimating lens (5) into plane-parallel light, splitting by the beam splitter prism (6), and modulation by the spatial light modulator (7) to generate structured light; the structured light is sequentially reflected by the beam splitter prism (6) and converged by the lens (8) to be measured to the image acquisition device (9), and a diffraction spot containing information of the object to be measured and the structured light is acquired by the image acquisition device (9).

2. The apparatus for wavefront reconstruction based on rotationally symmetric extended structured light illumination according to claim 1, wherein the image acquisition device (9) is a charge coupled device (CCD) camera.

3. The apparatus for wavefront reconstruction based on rotationally symmetric extended structured light illumination according to claim 1, wherein the laser beam emitted by the laser device (1) has a wavelength of 632.8 nm.

4. A method for wavefront reconstruction based on rotationally symmetric extended structured light illumination, implemented based on the apparatus for wavefront reconstruction based on rotationally symmetric extended structured light illumination according to claim 1 and comprising the following steps:

S1: setting up the apparatus for wavefront reconstruction based on rotationally symmetric extended structured light illumination, and acquiring a diffraction spot by the image acquisition device (9);

S2: performing, by using a phase retrieval method based on rotationally symmetric extended structured light illumination, phase retrieval on the diffraction spot acquired by the image acquisition device to obtain wavefront information of the lens to be measured;

the step S1 comprising:

S1.1: determining an initial orientation of the spatial light modulator, and obtaining optical parameters and rotation parameters of the structured light generated by the spatial light modulator, wherein the optical parameters of the structured light comprise a period and an amplitude of the structured light; the rotation parameters of the structured light comprise a single rotation angle $\Delta\varphi$, a total number N of rotations and a current rotation count n, wherein $N=360°/\Delta\varphi$, N being a multiple of 4; the structured light has an initial angle $\varphi_0=0°$, and the rotation count n has an initial value of 1;

S1.2: acquiring the diffraction spot;

S1.3: determining whether the current rotation count is greater than N/4;

if the current rotation count is greater than N/4, going to step S1.4;

if the current rotation count is not greater than N/4, rotating the structured light by the single rotation angle $\Delta\varphi$, updating the current rotation count to n+1, and updating the current angle of the structured light to $\varphi_n$, $\varphi_n=\varphi_{n-1}+\Delta\varphi$, $\varphi_{n-1}$ being an angle of the structured light corresponding to a previous rotation count; and going back to step S1.2;

S1.4: determine whether the number of direction changes of the spatial light modulator is equal to 3;

if the number of direction changes of the spatial light modulator is equal to 3, going to step 2.1;

if the number of direction changes of the spatial light modulator is not equal to 3, rotating counterclockwise the spatial light modulator by 90 degrees; updating the current rotation count to 1, updating the current angle of the structured light to 0°, and going back to step S1.2;

the step S2 comprising:

S2.1: sequentially inputting N diffraction spots acquired by the image acquisition device, and obtaining parameters of the lens to be measured, the rotation parameters of the structured light and a total number of iterations, wherein the parameters of the lens to be measured comprise a focal length and an aperture of the lens to be measured, and the rotation parameters of the structured light comprise the single rotation angle $\Delta\varphi$ and the current rotation count n; the current rotation count has an initial value of 1, and an iteration count k has an initial value of 1; and the total number of iterations is denoted by N_iter;

S2.2: obtaining a current design value of the rotationally symmetric structured light and a current estimated value of the lens to be measured; when k=1 and n=1, determining an initial design value of the structured light as the current design value of the rotationally symmetric structured light and an initial value of the lens to be measured as the current estimated value of the lens to be measured; when k=1 and n ≠1, determining a design value of the structured light at an angle of $\varphi_n$ as the current design value of the rotationally symmetric structured light and the initial value of the lens to be measured as the current estimated value of the lens to be measured;

and when k>1, determining an updated design value of the rotationally symmetric structured light at a previous iteration as the current design value of the rotationally symmetric structured light and an updated estimated value of the lens to be measured at the previous iteration as the current estimated value of the lens to be measured;

S2.3: stacking up the current design value of the rotationally symmetric structured light and the current estimated value of the lens to be measured to obtain a stacked value; and diffracting the stacked value to a spectrum plane using a computational diffraction method to obtain an estimated spectrum plane value;

S2.4: determining the square root of the intensity of a current diffraction spot as an amplitude value of the estimated spectrum plane value, wherein the current diffraction spot is the diffraction spot corresponding to the current rotation count n;

S2.5: updating the design value of the rotationally symmetric structured light and the estimated value of the lens to be measured;

S2.6: setting n=n+1; if n≤N/4, going back to step S2.2; and if n>N/4, going to step 2.7; and S2.7: setting k=k+1; if k≤N_iter, going back to step S2.2; and if k>N_iter, ending the iteration, and determining an updated estimated value of the lens to be measured at the current iteration as the final wavefront of the lens to be measured.

5. The method for wavefront reconstruction based on rotationally symmetric extended structured light illumination according to claim 4, after determining the square root of the intensity of a current diffraction spot as an amplitude value of the estimated spectrum plane value, further comprising:

obtaining an estimated stacked value by an inverse transform back to a space domain using an inverse diffraction method.

6. The method for wavefront reconstruction based on rotationally symmetric extended structured light illumination according to claim 5, wherein the updating of the design value of the rotationally symmetric structured light and the estimated value of the lens to be measured specifically comprises:

updating the estimated value of the lens to be measured based on the estimated stacked value according to a formula given below:

$$O^{(k(N/4-1)+n+1)} =$$

$$O^{(k(N/4-1)+n)} + \frac{|I_{ill}^{(n)(k)}|}{\max(\max(|I_{ill}^{(n)(k)}|))} \times \frac{I_{ill}^{(n)(k)*}}{(|I_{ill}^{(n)(k)}|^2 + \alpha)} \times (U^{(n)(k)} - U^{(n)(k-1)});$$

updating the design value of the rotationally symmetric structured light based on the estimated stacked value according to a formula given below:

$$I_{ill}^{(n)(k+1)} = I_{ill}^{(n)(k)} +$$

$$\frac{|O^{(k(N/4-1)+n)}|}{\max(\max(|O^{(k(N/4-1)+n)}|))} \times \frac{O^{(k(N/4-1)+n)*}}{(|O^{(k(N/4-1)+n)}|^2 + \alpha)} \times (U^{(n)(k)} - U^{(n)(k-1)});$$

wherein $O^{(k(N/4-1)+n+1)}$ is the updated estimated value of the lens to be measured, $O^{(k(N/4-1)+n)}$ is the current estimated value of the lens to be measured, $U^{(n)(k)}$ is an estimated stacked value at the current iteration, $U^{(n)(k-1)}$ is an estimated stacked value at the previous iteration, $\alpha$ is a constant, $I_{ill}^{(n)(k)}$ is the current design value of the rotationally symmetric structured light, and $I_{ill}^{(n)(k+1)}$ is the updated design value of the rotationally symmetric structured light.

7. A method for wavefront reconstruction based on rotationally symmetric extended structured light illumination, implemented based on the apparatus for wavefront reconstruction based on rotationally symmetric extended structured light illumination according to claim 2 and comprising the following steps:
S1: setting up the apparatus for wavefront reconstruction based on rotationally symmetric extended structured light illumination, and acquiring a diffraction spot by the image acquisition device (9);
S2: performing, by using a phase retrieval method based on rotationally symmetric extended structured light illumination, phase retrieval on the diffraction spot acquired by the image acquisition device to obtain wavefront information of the lens to be measured;
the step S1 comprising:
S1.1: determining an initial orientation of the spatial light modulator, and obtaining optical parameters and rotation parameters of the structured light generated by the spatial light modulator, wherein the optical parameters of the structured light comprise a period and an amplitude of the structured light; the rotation parameters of the structured light comprise a single rotation angle $\Delta_\varphi$, a total number N of rotations and a current rotation count n, wherein $N=360°/\Delta_\varphi$, N being a multiple of 4; the structured light has an initial angle $\varphi_0=0°$, and the rotation count n has an initial value of 1;
S1.2: acquiring the diffraction spot;
S1.3: determining whether the current rotation count is greater than N/4;
if the current rotation count is greater than N/4, going to step S1.4;
if the current rotation count is not greater than N/4, rotating the structured light by the single rotation angle $\Delta_\varphi$, updating the current rotation count to n+1, and updating the current angle of the structured light to $\varphi_n$, $\varphi_n=\varphi_{n-1}+\Delta\varphi$, $\varphi_{n-1}$ being an angle of the structured light corresponding to a previous rotation count; and going back to step S1.2;
S1.4: determine whether the number of direction changes of the spatial light modulator is equal to 3;
if the number of direction changes of the spatial light modulator is equal to 3, going to step 2.1;
if the number of direction changes of the spatial light modulator is not equal to 3, rotating counterclockwise the spatial light modulator by 90 degrees; updating the current rotation count to 1, updating the current angle of the structured light to 0°, and going back to step S1.2;
the step S2 comprising:
S2.1: sequentially inputting N diffraction spots acquired by the image acquisition device, and obtaining parameters of the lens to be measured, the rotation parameters of the structured light and a total number of iterations, wherein the parameters of the lens to be measured comprise a focal length and an aperture of the lens to be measured, and the rotation parameters of the structured light comprise the single rotation angle $\Delta_\varphi$ and the current rotation count n; the current rotation count has an initial value of 1, and an iteration count k has an initial value of 1; and the total number of iterations is denoted by N_iter;
S2.2: obtaining a current design value of the rotationally symmetric structured light and a current estimated value of the lens to be measured; when k=1 and n=1, determining an initial design value of the structured light as the current design value of the rotationally symmetric structured light and an initial value of the lens to be measured as the current estimated value of the lens to be measured; when k=1 and n #1, determining a design value of the structured light at an angle of $\varphi_n$ as the current design value of the rotationally symmetric structured light and the initial value of the lens to be measured as the current estimated value of the lens to be measured; and when k>1, determining an updated design value of the rotationally symmetric structured light at a previous iteration as the current design value of the rotationally symmetric structured light and an updated estimated value of the lens to be measured at the previous iteration as the current estimated value of the lens to be measured;
S2.3: stacking up the current design value of the rotationally symmetric structured light and the current estimated value of the lens to be measured to obtain a stacked value; and diffracting the stacked value to a spectrum plane using a computational diffraction method to obtain an estimated spectrum plane value;
S2.4: determining the square root of the intensity of a current diffraction spot as an amplitude value of the estimated spectrum plane value, wherein the current diffraction spot is the diffraction spot corresponding to the current rotation count n;
S2.5: updating the design value of the rotationally symmetric structured light and the estimated value of the lens to be measured;
S2.6: setting n=n+1; if n≤N/4, going back to step S2.2; and if n>N/4, going to step 2.7; and
S2.7: setting k=k+1; if k≤N_iter, going back to step S2.2; and if k>N_iter, ending the iteration, and determining an updated estimated value of the lens to be measured at the current iteration as the final wavefront of the lens to be measured.

8. The method for wavefront reconstruction based on rotationally symmetric extended structured light illumination according to claim 7, after determining the square root of the intensity of a current diffraction spot as an amplitude value of the estimated spectrum plane value, further comprising:
   obtaining an estimated stacked value by an inverse transform back to a space domain using an inverse diffraction method.

9. The method for wavefront reconstruction based on rotationally symmetric extended structured light illumination according to claim 8, wherein the updating of the design value of the rotationally symmetric structured light and the estimated value of the lens to be measured specifically comprises:
   updating the estimated value of the lens to be measured based on the estimated stacked value according to a formula given below:

$$O^{(k(N/4-1)+n+1)} = O^{(k(N/4-1)+n)} + \frac{|I_{ill}^{(n)(k)}|}{\max(\max(|I_{ill}^{(n)(k)}|))} \times \frac{I_{ill}^{(n)(k)*}}{(|I_{ill}^{(n)(k)}|^2 + \alpha)} \times (U^{(n)(k)} - U^{(n)(k-1)});$$

updating the design value of the rotationally symmetric structured light based on the estimated stacked value according to a formula given below:

$$I_{ill}^{(n)(k+1)} = I_{ill}^{(n)(k)} + \frac{|O^{(k(N/4-1)+n)}|}{\max(\max(|O^{(k(N/4-1)+n)}|))} \times \frac{O^{(k(N/4-1)+n)*}}{(|O^{(k(N/4-1)+n)}|^2 + \alpha)} \times (U^{(n)(k)} - U^{(n)(k-1)});$$

wherein $O^{(k(N/4-1)+n+1)}$ is the updated estimated value of the lens to be measured, $O^{(k(N/4-1)+n)}$ is the current estimated value of the lens to be measured, $U^{(n)(k)}$ is an estimated stacked value at the current iteration, $U^{(n)(k-1)}$ is an estimated stacked value at the previous iteration, $\alpha$ is a constant, $I_{ill}^{(n)(k)}$ is the current design value of the rotationally symmetric structured light, and $I_{ill}^{(n)(k+1)}$ is the updated design value of the rotationally symmetric structured light.

10. A method for wavefront reconstruction based on rotationally symmetric extended structured light illumination, implemented based on the apparatus for wavefront reconstruction based on rotationally symmetric extended structured light illumination according to claim 3 and comprising the following steps:
   S1: setting up the apparatus for wavefront reconstruction based on rotationally symmetric extended structured light illumination, and acquiring a diffraction spot by the image acquisition device (9);
   S2: performing, by using a phase retrieval method based on rotationally symmetric extended structured light illumination, phase retrieval on the diffraction spot acquired by the image acquisition device to obtain wavefront information of the lens to be measured;
   the step S1 comprising:
   S1.1: determining an initial orientation of the spatial light modulator, and obtaining optical parameters and rotation parameters of the structured light generated by the spatial light modulator, wherein the optical parameters of the structured light comprise a period and an amplitude of the structured light; the rotation parameters of the structured light comprise a single rotation angle $\Delta_\varphi$, a total number N of rotations and a current rotation count n, wherein $N=360°/\Delta_\varphi$, N being a multiple of 4; the structured light has an initial angle $\varphi_0=0°$, and the rotation count n has an initial value of 1;
   S1.2: acquiring the diffraction spot;
   S1.3: determining whether the current rotation count is greater than N/4;
   if the current rotation count is greater than N/4, going to step S1.4;
   if the current rotation count is not greater than N/4, rotating the structured light by the single rotation angle $\Delta_\varphi$, updating the current rotation count to n+1, and updating the current angle of the structured light to $\varphi_n$, $\varphi_n = \varphi_{n-1} + \Delta_\varphi$, $\varphi_{n-1}$ being an angle of the structured light corresponding to a previous rotation count; and going back to step S1.2;
   S1.4: determine whether the number of direction changes of the spatial light modulator is equal to 3;
   if the number of direction changes of the spatial light modulator is equal to 3, going to step 2.1;
   if the number of direction changes of the spatial light modulator is not equal to 3, rotating counterclockwise the spatial light modulator by 90 degrees; updating the current rotation count to 1, updating the current angle of the structured light to 0°, and going back to step S1.2;
   the step S2 comprising:
   S2.1: sequentially inputting N diffraction spots acquired by the image acquisition device, and obtaining parameters of the lens to be measured, the rotation parameters of the structured light and a total number of iterations, wherein the parameters of the lens to be measured comprise a focal length and an aperture of the lens to be measured, and the rotation parameters of the structured light comprise the single rotation angle $\Delta_\varphi$ and the current rotation count n; the current rotation count has an initial value of 1, and an iteration count k has an initial value of 1; and the total number of iterations is denoted by N_iter;
   S2.2: obtaining a current design value of the rotationally symmetric structured light and a current estimated value of the lens to be measured; when k=1 and n=1, determining an initial design value of the structured light as the current design value of the rotationally symmetric structured light and an initial value of the lens to be measured as the current estimated value of the lens to be measured; when k=1 and n #1, determining a design value of the structured light at an angle of $\varphi_n$ as the current design value of the rotationally symmetric structured light and the initial value of the lens to be measured as the current estimated value of the lens to be measured; and when k>1, determining an updated design value of the rotationally symmetric structured light at a previous iteration as the current design value of the rotationally symmetric structured light and an updated estimated value of the lens to be measured at the previous iteration as the current estimated value of the lens to be measured;
   S2.3: stacking up the current design value of the rotationally symmetric structured light and the current estimated value of the lens to be measured to obtain a stacked value; and diffracting the stacked value to a spectrum plane using a computational diffraction method to obtain an estimated spectrum plane value;
   S2.4: determining the square root of the intensity of a current diffraction spot as an amplitude value of the estimated spectrum plane value, wherein the current diffraction spot is the diffraction spot corresponding to the current rotation count n;

S2.5: updating the design value of the rotationally symmetric structured light and the estimated value of the lens to be measured;

S2.6: setting n=n+1; if n≤N/4, going back to step S2.2; and if n>N/4, going to step 2.7; and S2.7: setting k=k+1; if k≤N_iter, going back to step S2.2; and if k>N_iter, ending the iteration, and determining an updated estimated value of the lens to be measured at the current iteration as the final wavefront of the lens to be measured.

11. The method for wavefront reconstruction based on rotationally symmetric extended structured light illumination according to claim 10, after determining the square root of the intensity of a current diffraction spot as an amplitude value of the estimated spectrum plane value, further comprising:

obtaining an estimated stacked value by an inverse transform back to a space domain using an inverse diffraction method.

12. The method for wavefront reconstruction based on rotationally symmetric extended structured light illumination according to claim 11, wherein the updating of the design value of the rotationally symmetric structured light and the estimated value of the lens to be measured specifically comprises:

updating the estimated value of the lens to be measured based on the estimated stacked value according to a formula given below:

$$O^{(k(N/4-1)+n+1)} = O^{(k(N/4-1)+n)} + \frac{|I_{ill}^{(n)(k)}|}{\max(\max(|I_{ill}^{(n)(k)}|))} \times \frac{I_{ill}^{(n)(k)*}}{(|I_{ill}^{(n)(k)}|^2 + \alpha)} \times (U^{(n)(k)} - U^{(n)(k-1)});$$

updating the design value of the rotationally symmetric structured light based on the estimated stacked value according to a formula given below:

$$I_{ill}^{(n)(k+1)} = I_{ill}^{(n)(k)} + \frac{|O^{(k(N/4-1)+n)}|}{\max(\max(|O^{(k(N/4-1)+n)}|))} \times \frac{O^{(k(N/4-1)+n)*}}{(|O^{(k(N/4-1)+n)}|^2 + \alpha)} \times (U^{(n)(k)} - U^{(n)(k-1)});$$

wherein $O^{(k(N/4-1)+n+1)}$ is the updated estimated value of the lens to be measured, $O^{(k(N/4-1)+n)}$ is the current estimated value of the lens to be measured, $U^{(n)(k)}$ is an estimated stacked value at the current iteration, $U^{(n)(k-1)}$ is an estimated stacked value at the previous iteration, α is a constant, $I_{ill}^{(n)(k)}$ is the current design value of the rotationally symmetric structured light, and $I_{ill}^{(n)(k+1)}$ is the updated design value of the rotationally symmetric structured light.

* * * * *